United States Patent
Okada et al.

(10) Patent No.: US 6,930,146 B1
(45) Date of Patent: Aug. 16, 2005

(54) 1,2-POLYBUTADIENE, THERMOPLASTIC ELASTOMER COMPOSITION AND POLYMER COMPOSITION

(75) Inventors: Koji Okada, Mie (JP); Masato Suzuki, Mie (JP); Junji Kojina, Mie (JP)

(73) Assignee: JSR Corporation, Tokyo (JP)

( * ) Notice: Subject to any disclaimer, the term of this patent is extended or adjusted under 35 U.S.C. 154(b) by 185 days.

(21) Appl. No.: 10/333,988

(22) PCT Filed: Jul. 27, 2000

(86) PCT No.: PCT/JP00/05015

§ 371 (c)(1),
(2), (4) Date: Jan. 27, 2003

(87) PCT Pub. No.: WO02/10232

PCT Pub. Date: Feb. 7, 2002

(51) Int. Cl.$^7$ ................................................ C08L 9/00

(52) U.S. Cl. ...................... 525/99; 525/130; 525/177; 525/199; 525/227; 525/232; 525/235; 525/237; 525/914

(58) Field of Search ........................ 526/335; 525/99, 525/233, 235, 237, 130, 177, 199, 232, 227, 525/914

(56) References Cited

U.S. PATENT DOCUMENTS 5,548,045 A * 8/1996 Goto et al. ................ 526/161

FOREIGN PATENT DOCUMENTS

| JP | 69-32425 | 12/1969 |
|----|----------|---------|
| JP | 53-143685 | 12/1978 |
| JP | 57-53507 | 3/1982 |
| JP | 6-207048 | 7/1994 |
| JP | 2000-109618 | 4/2000 |

* cited by examiner

Primary Examiner—Fred Teskin
(74) Attorney, Agent, or Firm—Oblon, Spivak, McClelland, Maier & Neustadt, P.C.

(57) ABSTRACT

A polymer composition and a thermoplastic elastomer composition containing 1,2-polybutadiene having a 1,2-bond content in the butadiene unit of 70% by weight or more, a melting point in the range of 50 to 140° C., a total halogen content of 30 ppm or less, a viscosity η in the range of 400 to 1200 poise when measured with a slit die rheometer at a shear rate of 5113 sec$^{-1}$ at 120° C., a viscosity η in the range of 300 to 1000 poise when measured with a slit die rheometer at a shear rate of 5113 sec$^{-1}$ at 150° C., and a viscosity η in the range of 200 to 800 poise when measured with a slit die rheometer at a shear rate of 5113 sec$^{-1}$ at 180° C. exhibit excellent moldability, visual appearance and scratch resistance.

8 Claims, 1 Drawing Sheet

Fig. 1

1,2-POLYBUTADIENE, THERMOPLASTIC ELASTOMER COMPOSITION AND POLYMER COMPOSITION

TECHNICAL FIELD

The present invention relates to 1,2-polybutadiene and a thermoplastic elastomer composition and a polymer composition, more particularly, it relates to 1,2-polybutadiene having improved mold contamination, thermal deterioration and change with time in the properties at molding at a high temperature, and an thermoplastic elastomer composition excellent in a moldability, a transparency, a mechanical strength and an wet skid resistance. The 1,2-polybutadiene of the present invention is used as a thermoplastic elastomer for molding various molded articles such as industrial parts and footwears, various sheets, films and the like, and as an electron beam cross-linking resin, a modifier for a resin or a rubber, a vulcanized rubber and the like. In addition, a thermoplasic elastomer composition containing 1,2-polybutadiene is used as various molded articles such as industrial parts and footwears, various sheets, films, tubes and the like.

BACKGROUND ART

Since 1,2-polybutadiene having a suitably controllable crystallinity comprises a crystalline part and an amorphous part, and has a carbon—carbon double bond has a high chemical reactivity in a molecule, it has not only the function as a thermoplastic elastomer but also the function as the conventional vulcanized rubber and a thermosetting resin having the high cross-linking density. In addition, since this 1,2-polybutadiene is excellent in a processibility, it is applied as a modifier for other resins and thermoplastic elastomers, or a medical polymer material.

Conventionally, 1,2-polybutadiene having a controlled crystallinity has been obtained by using a catalyst comprising a cobalt salt phosphine complex, trialkylaluminium and water (JP-B-44-32425), or a catalyst comprising a cobalt compound, trialkylaluminium, water and a triphenylphosphine derivative (JP-B-61-27402). These catalytic systems show a high polymerization activity in a halogenated hydrocarbon solvent, such as methylene chloride, and has reduced polymerization activity in a hydrocarbon solvent, therefore, polymerization is performed by using a halogenated hydrocarbon solvent.

However, since 1,2-polybutadiene polymerized using a halogenated hydrocarbon solvent contains a considerable high amount of halogen such as chlorine and the like due to the solvent remaining therein, hydrogen halide such as hydrogen chloride is generated at high temperature molding, there arises problems that a mold is rusted, 1,2-polybutadiene is thermally deteriorated and the physical properties are changed with time.

Further, it is requested that 1,2-polybutadiene has more excellent properties as a thermoplastic elastomer.

An object of the present invention is to provide 1,2-polybutadiene which does not cause the mold contamination and the thermal deterioration at high temperature molding and has improved change with time in the physical properties, and a thermoplastic elastomer composition excellent in the moldability, the transparency, the mechanical strength and the wet skid resistance.

DISCLOSURE OF INVENTION

In order to solve the aforementioned problems, the present inventors studied intensively and, as a result, completed the present invention. That is, 1,2-polybutadiene of the invention described in claim 1 is characterized in that the 1,2-bond content in butadiene unit is 70% by weight or more, a melting point is in a range of 50–140° C., the viscosity η measured with a slit die rheometer at a shear rate of 5113 sec$^{-1}$ is in a range of 400–1200 poises at 120° C., in a range of 300–1000 poises at 150° C., and in a range of 200–800 poises at 180° C., and the total halogen content is 30 ppm or less.

The 1,2-bond content in butadiene unit of 1,2-polybutadiene of the invention described in claim 1 has the close relationship with the thermoplastic elastomer properties, and is 70% by weight or more, preferably 80% by weight or more.

In addition, the aforementioned 1,2-polybutadiene has a crystalline property and a melting point thereof is in a range of 50–140° C., preferably 60–130° C. When a melting point is in this range, 1,2-polybutadiene is excellent in the balance between the mechanical strength such as tensile strength, the tear strength and the like and the flexibility as a thermoplastic elastomer.

The viscosity η of 1,2-polybutadiene of the invention described in claim 1 measured with a slit die rheometer at a shear rate of 5113 sec$^{-1}$ is in each viscosity range at each temperature described above. When the viscosity η at each temperature is less than each lower viscosity limit described above, 1,2-polybutadiene is inferior in the mechanical strength, being not preferable. When the viscosity exceeds each upper viscosity limit, the processibility and moldability are inferior, being not preferable. A method for measuring the viscosity η with a slit die rheometer will be described in detail in Examples.

The 1,2-polybutadiene of the invention described in claim 1 has a total amount of halogen of 30 ppm or less. Usually, an amount of halogen in a polymer is measured by quantitative analysis with fluorescent X-ray, and 30 ppm is a lower limit of measurement in this method. Since a total amount of halogen remaining in 1,2-polybutadiene of the present invention is slight like this, the mold contamination and the thermal deterioration are not occured at high temperature molding such as injection molding, a problem such as change with time in the physical properties is improved, the processibility and moldability is better, and the physical properties of a molded articles are maintained for a long period of time.

The 1,2-polybutadiene of the present invention may be copolymerized with conjugated diene other than butadiene. Examples of conjugated diene other than butadiene include 1,3-pentadiene, 1,3-butadiene derivative substituted with a higher alkyl group, 2-alkyl-substituted-1,3-butadiene and the like. Among them, examples of the 1,3-butadiene derivative substituted with a higher alkyl group include 1-pentyl-1,3-butadiene, 1-hexyl-1,3-butadiene, 1-heptyl-1,3-butadiene, 1-octyl-1,3-butadiene and the like.

In addition, examples of the 2-alkyl-substituted-1,3-butadiene include 2-methyl-1,3-butadiene (isoprene), 2-ethyl-1,3-butadiene, 2-propyl-1,3-butadiene, 2-isopropyl-1,3-butadiene, 2-butyl-1,3-butadiene, 2-isobutyl-1,3-butadiene, 2-amyl-1,3-butadiene, 2-isoamyl-1,3-butadiene, 2-hexyl-1,3-butadiene, 2-cyclohexyl-1,3-butadiene, 2-isohexyl-1,3-butadiene, 2-heptyl-1,3-butadiene, 2-isoheptyl-1,3-butadiene, 2-octyl-1,3-butadiene, 2-isooctyl-1,3-butadiene and the like.

Among these conjugated dienes, examples of a preferable conjugated diene to be copolymerized with butadiene include isoprene and 1,3-pentadiene.

The content of butadiene in a monomer component to be supplied to polymerization is 50 mol % or more, particularly preferably 70 mol % or more. When a conjugated diene other than butadiene is copolymerized too much, a melting point or a viscosity of the resulting 1,2-polybutadiene are outside the aforementioned ranges in some cases.

The 1,2-polybutadiene of the present invention is obtained by polymerizing butadiene in the presence of a catalyst containing a cobalt compound and aluminoxane.

Examples of the aforementioned cobalt compound include organic acid salts of cobalt, preferably, having a carbon number of 4 or more. Examples of the organic acid salt of cobalt include butyric acid salt, hexanoic acid salt, heptylic acid salt, octylic acid salt such as 2-ethylhexylic acid and the like, decanoic acid salt, higher fatty acid salt such as stearic acid, oleic acid, erucic acid and the like, benzoic acid salt, tolylic acid salt, xylylic acid, alkyl, aralkyl and allyl-substituted benzoic acid salt such as ethylbenzoic acid and the like, naphtoic acid salt, alkyl, aralkyl or allyl-substituted naphtoic acid salt and the like. Among them, so-called octylic acid salt such as 2-ethylhexylic acid, stearic acid salt and benzoic acid salt are excellent in the solubility in hydrocarbon solvent, being preferable.

Examples of the aluminoxane include ones represented by the following general formula (I) or general formula (II).

(I)

(II)

In aluminoxane represented by the general formula (I) or (II), R is a hydrocarbon group such as methyl group, ethyl group, propyl group, butyl group and the like, preferably methyl group or ethyl group, particularly preferably methyl group. In the general formula (I), Rs on both terminals may be the same or different. In addition, m is an integer of 2 or more, preferably an integer of 5 or more, more preferably an integer of 10–100. Examples of aluminoxane include methylaluminoxane, ethylaluminoxane, propylaluminoxane, butylaluminoxane and the like, and methylaluminoxane is particularly preferable.

A polymerization catalyst containing a phosphine compound besides the aforementioned cobalt compound and aluminoxane is extremely preferable. A phosphine compound is a component effective in controlling the activity of a polymerization catalyst and the control of the vinyl binding structure and the crystalline property. A preferable examples thereof include an organic phosphorus compound represented by the following general formula (III).

(III)

In the general formula (III), Ar denotes a group described below:

(wherein $R^1$, $R^2$ and $R^3$ are the same or different, and represent a hydrogen atom, an alkyl group having a carbon number of, preferably 1–6, a halogen atom, an alkoxy group having a carbon number of, preferably 1–6, or an aryl group having a carbon number of, preferably, 6–12.)

In addition, in the general formula (III), R denotes a cycloalkyl group or an alkyl-substituted cycloalkyl group, n is an integer of 0–3.

Examples of the phosphine compound represented by the general formula (III) include tris(3-methylphenyl)phosphine, tris(3-ethylphenyl)phosphine, tris(3,5-dimethylphenyl)phosphine, tris(3,4-dimethylphenyl)phosphine, tris(3-isopropylphenyl)phosphine, tris(3-t-butylphenyl)phosphine, tris(3,5-diethylphenyl)phosphine tris(3-methyl-5-ethylphenyl)phosphine, tris(3-phenylphenyl)phosphine, tris(3,4,5-trimethylphenyl)phosphine, tris(4-methoxy-3,5-dimethylphenyl)phosphine, tris(4-ethoxy-3,5-diethylphenyl)phosphine, tris(4-butoxy-3,5-dibutylphenyl)phosphine, tris(p-methoxyphenylphosphine), tricyclohexylphosphine, dicyclohexylphenylphosphine, tribenzylphosphine, tris(4-methylphenylphosphine), tris(4-ethylphenylphosphine) and the like. Among them, particularly preferred are triphenylphosphine, tris(3-methylphenyl)phosphine, tris(4-methoxy-3,5-dimethylphenyl)phosphine and the like.

In addition, as the cobalt compound, a cobalt compound represented by the following general formula (IV) can be used.

(IV)

The compound represented by the aforementioned general formula (IV) is a complex having as a ligand a phosphine compound wherein n=3 in the aforementioned general formula (III) relative to cobalt chloride. Upon use of this cobalt compound, a cobalt compound which was synthesized in advance may be used, or a cobalt compound may be used by a method for contacting cobalt chloride and a phosphine compound in a polymerization system. An amount of a 1,2-bond and the crystallinity of the resulting 1,2-polybutadiene can be controlled.

Examples of the cobalt compound represented by the aforementioned general formula (IV) include cobalt bis(triphenylphosphine)dichloride, cobalt bis[tris(3-methylphenylphosphine)]dichloride, cobalt bis[tris(3-ethylphenylphosphine)]dichloride, cobalt bis[tris(4-methylphenylphosphine)]dichloride, cobalt bis[tris(3,5- dimethylphenylphosphine)]dichloride, cobalt bis[tris(3,4-dimethylphenylphosphine)]dichloride, cobalt bis[tris(3-isopropylphenylphosphine)]dichloride, cobalt bis[tris(3-t-butylphenylphosphine)]dichloride, cobalt bis[tris(3,5-dimethylphenylphosphine)]dichloride cobalt bis[tris(3-methyl-5-ethylphenylphosphine)]dichloride, cobalt bis[tris(3-phenylphenylphosphine)]dichloride, cobalt bis[tris(3,4,5-trimethylphenylphosphine)]dichloride, cobalt bis[tirs(4-methoxy-3,5-dimethylphenylphosphine)]dichloride, cobalt bis[tris(4-ethoxy-3,5-diethylphenylphosphine)]dichloride, cobalt bis[tris(4-butoxy-3,5-dibutylphenylphosphine)]dichloride, cobalt bis [tris(4-methoxyphenylphosphine)]dichloride, cobalt bis[tris(3-methoxyphenylphosphine)]dichloride, cobalt bis[tris(4-dodecylphenylphosphine)]dichloride, cobalt bis[tris(4-ethylphenylphosphine)]dichloride and the like.

Among them, particularly preferred are cobalt bis(triphenylphosphine) dichloride, cobalt bis[tris(3-methylphenylphosphine)]dichloride, cobalt bis[tris(3,5-dimethylphenylphosphine)]dichloride, cobalt bis[tris(4-methoxy-3,5-dimethylphenylphosphine)]dichloride and the like.

As an amount of a catalyst to be used, a cobalt compound is used at 0.001–1 mmol, preferably 0.01–0.5 mmol in terms of cobalt atom per 1 mol of butadiene in the case of polymerization of butadiene alone, or per 1 mol of at a total amount of butadiene and conjugated diene other than butadiene. In addition, as an amount of phosphine compound to be used, a ratio of phosphorous atom relative to cobalt atom (P/Co) is usually 0.1–50, preferably 0.5–20, more preferably 1–20. Further, as an amount of aluminoxane to be used, a ratio of aluminum atom relative to cobalt atom of a cobalt compound (Al/Co) is usually 4–$10^7$, preferably 10–$10^6$.

When a complex represented by the general formula (IV) is used, when as an amount of a phosphine compound to be used, a ratio of phosphorus atom relative to cobalt atom (P/Co) is regarded as 2, an amount of aluminoxane is as described above.

Examples of an inert organic solvent used as a polymerization solvent include aromatic hydrocarbons such as benzene, toluene, xylene, cumene and the like, aliphatic hydrocarbons such as n-pentane, n-hexane, n-butane and the like, alicyclic hydrocarbons such as cyclopentane, methylcyclopentane, cyclohexane and the like and a mixture of them.

A polymerization temperature is usually −50–120° C., preferably-20–100° C. A polymerization reaction is preferably continuous polymerization in which a plurality of reactors is connected in series. The concentration of a monomer in a solvent is usually 5–50% by weight, preferably 10–35% by weight. In addition, for preparing a polymer, in order that a catalyst and a polymer in the present invention are not inactivated, it is necessary that contamination of a compound having the activity of inactivation such as oxygen, water, carbonic gas and the like into a polymerization system is diminished as much as possible. When a polymerization reaction proceeds to a desired stage, an alcohol, other polymerization termination agent, an aging preventing agent, an antioxidant, an ultraviolet absorbing agent and the like are added to the reaction mixture, and the produced polymer is separated, washed and dried according to the conventional method to obtain 1,2-polybutadiene of the present invention.

Since 1,2-polybutadiene of the present invention itself can obtain the sufficient strength without cross-linking, it is suitable for use in industrial parts such as injection molding, extrusion molding and the like, and non-cross-linking molding such as films and the like.

In addition, since 1,2-polybutadiene of the present invention is also excellent in cross-linking reactivity, it is suitably used in a cross-linked rubber and a reaction aid for a vulcanized rubber.

Upon this, a method of processing is not particularly limited but mixing such as melt kneading and the like using a roll, a kneader, a Banbury mixer, a screw extruder, a feeder ruder extruder and the like which are used in rubber processing is possible.

In addition, 1,2-polybutadiene of the present invention is suitably used as a modifier for other thermoplastic elastomers and resins.

The thermoplastic elastomer composition of the present invention described in claim 2 is characterized in that it contains a thermoplastic elastomer selected from an aromatic vinyl-based thermoplastic elastomer, an urethane-based thermoplastic elastomer, a polyester-based thermoplastic elastomer, a polyamide-based thermoplastic elastomer, a vinyl chloride-based thermoplastic elastomer and a fluorine-based thermoplastic elastomer, and the aforementioned 1,2-polybutadiene.

Examples of the aforementioned aromatic vinyl-based thermoplastic elastomer include a block copolymer of an aromatic vinyl compound and conjugated diolefin such as polystyrene-polybutadiene block copolymer, polystyrene-polybutadiene-polystyrene block copolymer, polystyrene-poly(styrene-butadiene)-polystyrene block copolymer, polystyrene-polyisoprene-polystyrene copolymer and the aforementioned block copolymer wherein a part or the whole of styrene is substituted with α-methylene, and hydrogenated these block copolymers. Preferably, polystyrene-polybutadiene-polystyrene block copolymer is used.

Examples of the aforementioned polyester-based thermoplastic elastomer include multi-blocks polymers using polybutylene terephthalate as a hard segment and polytetramethylene ether glycol as a soft segment and the like. Examples of the aforementioned polyamide-based thermoplastic elastomer include block polymers using nylon as a hard segment and polyester or polyol as a soft segment and the like.

A ratio of the aforementioned thermoplastic elastomer and the aforementioned 1,2-polybutadiene in the thermoplastic elastomer composition can be such that the aforementioned thermoplastic elastomer is 50–99 parts by weight and the aforementioned 1,2-polybutadiene is 1–50 parts by weight as shown in claim 3. When the content of the aforementioned 1,2-polybutadiene is less than 1 part by weight, the molding appearance is inferior and, when the content exceeds 50 parts by weight, the characteristics of the thermoplastic elastomer itself to be used are lost, being not preferable.

The elastomer composition of the invention described in claim 6 is characterized in that it contains a polyolefin-based polymer and the aforementioned 1,2-polybutadiene. The aforementioned polyolefin-based polymer is not particularly limited and may be a resin or an elastomer as long as it is thermoplastic. In addition, as this polyolefin-based polymer, a polymer containing at least one selected from the group consisting of an ethylene component, a propylene and a butylene component is preferably used as shown in claim 8. Examples of them include polyethylene, polypropylene, ethylene propylene copolymer (EPR, EPDM), polybutylene, polyisobutylene, ethylene-vinyl acetate copolymer and the like. Among them, polyethylene, polypropylene, crystalline ethylene-propylene copolymer and ethylene-vinyl acetate copolymer are preferably used.

A ratio of the aforementioned polyolefin polymer and the aforementioned 1,2-polybutadiene can be such that the aforementioned polyolefin polymer is 70–99 parts by weight and the aforementioned 1,2-polybutadiene is 1–20 parts by weight as shown in claim 7. When the content of the aforementioned 1,2-polybutadiene is less than 1 part by weight, the scratch resistance of a molded article of a polyolefin polymer is inferior and, when the content exceeds 20 parts by weight, the properties of polyolefin polymer itself are lost, being not preferable.

BEST MODE FOR CARRYING OUT THE INVENTION

The present invention will be explained specifically by way of Examples and Comparative Examples below. However, the present invention is not limited by them as long as it is not beyond the gist of the present invention. Unless otherwise indicated, part and % in Examples and Comparative Examples are based on weight.

In addition, various measurements in Examples and Comparative Examples were performed by the following methods.

(1) Methods of Evaluation

① Viscosity

Figure 1:
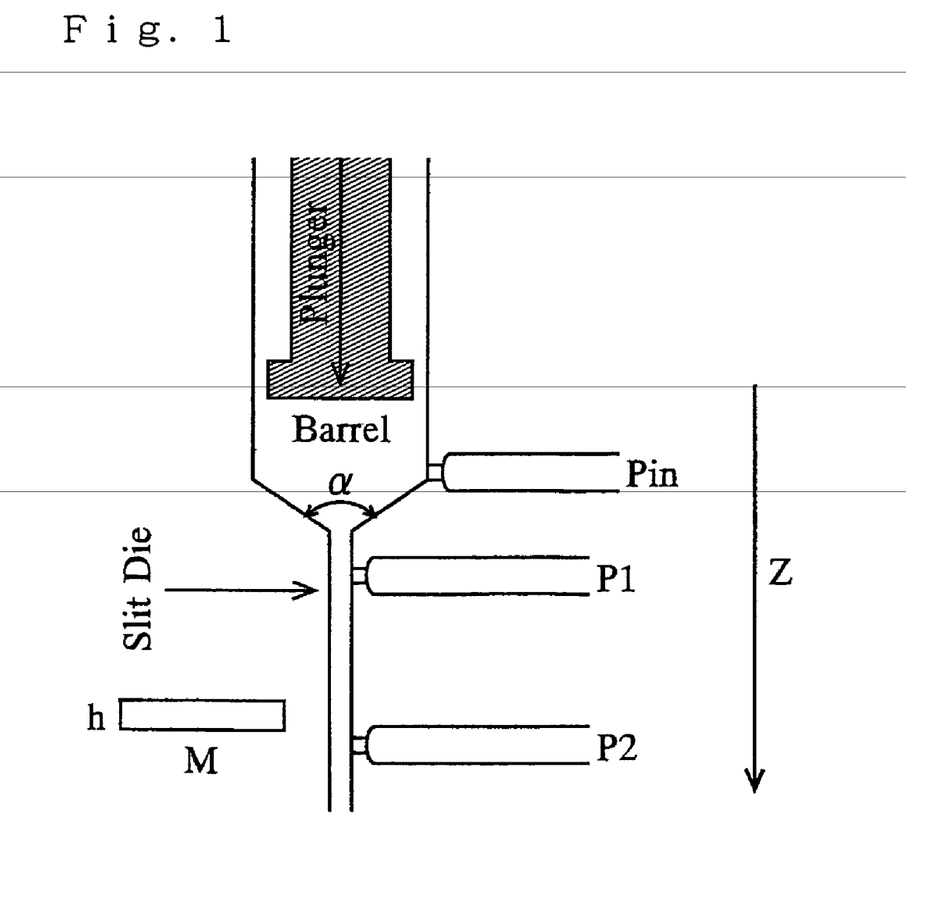
FIG. 1 is a schematic cross-sectional view of a slit die rheometer.

The viscosity was measured using a slit die rheometer, and an outline of a structure is shown in FIG. 1. That is, a slit die rheometer was used in which two pressure sensors (P1, P2), a slit die, and cylinder (Barrel) pressure sensor (Pin) are fixed to a die part.

A polymer was filled in a cylinder maintained at a predetermined temperature, and the viscosity when extruded at a rate of a plunger of 5000 cm/min. (upon this, a shear rate was 5113 sec$^{-1}$) was measured.

In FIG. 1, a diameter of cylinder is 15 mm, transverse section h×M of a slit die is 1 mm×12 mm, a length is 54 mm, and a hopper angle is 90 degree.

② 1,2-Bond Content

The 1,2-bond content in butadiene unit of was obtained by an infrared absorption spectrum method by D. Morero et al. (Chem. e. Ind., 41, 758(1959)).

③ Melting Point

A melting point was measured using DSC (differential scanning calorimeter) according to ASTM D3418.

④ Crystallinity

The crystallinity was obtained by density measurement according to JIS K7112. Upon this, as the density of 1,2-polybutadiene having the crystallinity of 100%, 0.963 by G. Natta (J. Polymer. Sci., 20, 25(1956)) was used. And, as the density of 1,2-polybutadiene having the crystallinity of 0%, the density of 0.892 of 1,2-polybutadiene which had been confirmed to be amorphous by X-ray analysis (JP-B-44-32425, JP-B-4-32426) was used.

⑤ Halogen Content

The halogen content was measured by a fluorescent X-ray method.

⑥ Mechanical Strength;Tensile Strength (TB), Tensile Elongation (EB)

The mechanical strength was measured using a molded article obtained by injection-molding under the molding conditions shown below according to JIS K6301.

(Molding Conditions)
Molding machine: in-line screw type injection molding machine
Mold: 2×70×150 mm direct gate plate
Molding temperature: 150° C.
Injection pressure: 660 kg/cm$^2$
Flow control: medium
Injection: 10 seconds
Cooling: 50 seconds
Mold temperature: 30° C.

⑦ Wet Skid Resistance

A sample having an inner diameter of 50 mm and an external diameter of 70 mm was prepared from a molded article obtained by injection-molding as in the aforementioned ⑥, and the wet skid resistance was measured using JSR-type WSR tester.

(Measuring Conditions)
Road surface, porcelain tile completely wetted with water (measured at a water amount of about 180 cc/min.).
Sample rotation number: 600 rotation
Contact pressure: 3 kg/cm$^2$
Contact time: 0.02 second The results are expressed by an A value calculated by the following equation. As this value grows larger, the wet skid resistance becomes better.

$$A = (\text{torque value when a road surface and a sample are contacted}) \div (\text{load at contact})$$

⑧ Evaluation on Appearance of Molded Article

The flow mark, the surface roughness, the brushing, the silver streak, the bluing and the like on the surface of a molded article obtained by injection-molding in the aforementioned ⑥ were observed with naked eyes, and assessed according to the 3 levels.
○: Excellent
Δ: usable but inferior in the aforementioned properties
×: unfit for use ⑨ Parallel Rays Transmittance The parallel rays transmittance was measured using a film prepared by the following molding conditions according to JIS K6714.

(Molding conditions)
Extruder: 50 mm Φ extruder
Screw: shape metering type, L/D 28, compression ratio 2.0
Die: bore diameter 75 mm Φ, lip interval 0.7 mm
Extruding temperature: 150° C.
Resin pressure: 155 kg/mm$^2$
Discharge amount: 31 kg/hr
Blow ratio: 4.8
Take-off speed: 15 m/min.
Film thickness: 50 μm Water Vapor Permeability The water vapor permeability was measured using a film made as in the aforementioned ⑨ according to JIS Z0208.

Gas Permeability

The oxygen permeability and the ethylene oxide permeability were measured using a film made as in the aforementioned ⑨ according to ASTM D1434.

Thermal Stability

The thermal stability was assessed using, as a stabilizing time, an initial time for torque measured using a laboplastmill under the following conditions. Here, an initial time for torque is defined as a time indicated by a cross point with a time axis when a straight line at an angle of 30 degree relative to a baseline is drawn on an initial part of a torque carve.

(Measuring conditions)
Mixer: volume 100 cc, blade shape roller shape
Measuring temperature: 170° C.
Rotation number: 60 rpm
Packing ratio: 80%

Evaluation of Processibility and Vulcanized Material

A polymer and other components except for vulcanizing accelerator and sulfur were kneaded in a Banbury mixer at a cooling water temperature of 70° C. for 5 minutes in advance according to the following formulation, and a vulcanizing accelerator and sulfur were added with a roller to obtain an unvulcanized compound. The resulting unvulcanized compound was press-vulcanized at 160° C. for 20 minutes to obtain a vulcanized material.

(Compounding Formulation)

| Polymer | 100 parts by weight |
|---|---|
| Zinc white No. 1 | 3 |
| Stearic acid | 1 |
| Dibenzothiazyl disulfide | 1.5 |
| Tetramethylthiuram disulfide | 0.55 |
| Sulfur | 1.6 |

Evaluation of a vulcanized material was performed according to JIS K6301.

Evaluation of the processibility was assessed by the following 2 levels.

○: Excellent in the melting property, the roll winding property and the roll separability ×: Inferior in the meltability, the roll wrapping property and/or the roll separability Evaluation of Scratch Resistance The surface of a molded article having 150×150×2(mm$^3$) shape was irradiated with electron beam (accelerating voltage 150 kV, radiation dose 30 Mrad), and scratched with a nail. The evaluation was assessed according to the following 3 levels.

○: No scratch mark
Δ: Slight scratch mark
×: Easily scratched (2) Evaluation of 1,2-polybutadiene Example 1

Synthesis of Polymer A

The polymer A was synthesized by continuous polymerization using an apparatus in which three vertical reactors equipped with a stirrer having an inner volume of 20 L are connected in series. A cyclohexane/n-heptane (weight ratio: 80/20) mixed solvent was supplied at 270 mL/min. through a position near a bottom of a first reactor, and 1,3-butadiene was supplied at 43 g/min., a solution of methylaluminoxane in toluene at 1 mL/min., and a solution of cobalt bis[tris(4-methylphenylphosphine)]dichloride in toluene at 1 mL/min., followed by polymerization at 40° C. Upon this, a molar ratio of Co atom/1,3-butadiene was 1/63000, and an atomic ratio of Al/Co was 38/1. A retention time (polymerization time) for a first reactor was 1 hour, and conversion degree was 58%.

A polymerization solution removed through a position near a top of a first reactor was supplied to a position near a bottom of a second reactor, followed by polymerization for 1 hour. At the second reactor, conversion degree became 76%. Further, a polymerization solution removed through a position near a top of the second reactor was supplied to a position near a bottom of a third reactor, followed by polymerization for 1 hour. At the third reactor, conversion degree became 85%.

A polymerization reaction was terminated by injecting a small amount of ethanol containing 2,6-di-t-butyl-p-cresol as a terminator into a pipe for conveying a polymerization solution taken out through a position near a top of the third reactor. Then, the material was supplied to a devolatilizer (direct work-up equipment) set at 170° C. and 250 Torr, the solvent was removed, and the material was pelletized with a pelletizer to obtain a polymer A.

Example 2

Synthesis of Polymer B

According to the same manner as that for polymer A except that a polymerization temperature was 60° C., a polymer B was obtained at conversion degree of 85%.

Example 3

Synthesis of Polymer C

According to the same manner as that for a polymer A except that the mixed solvent was supplied at 260 mL/min., 1,3-butadiene was supplied at 47.5 g/min., a polymerization temperature was 80° C., a molar ratio of Co atom/1,3-butadiene was 1/73000 and an atomic ratio of Al/Co was 44/1, a polymer C was obtained at conversion degree of 75%.

Example 4

Synthesis of Polymer D

According to the same manner as that for a polymer A except that a polymerization temperature was 70° C., a molar ratio of Co atom/1,3-butadiene was 1/73000, and an atomic ratio of Al/Co was 44/1, a polymer D was obtained at conversion degree of 80%.

Example 5

Synthesis of Polymer E

According to the same manner as that for a polymer A except that a polymerization temperature was 60° C., a molar ratio of Co atom/1,3-butadiene was 1/70000, and an atomic ratio of Al/Co was 42/1, a polymer E was obtained at conversion degree of 85%.

Example 6

Synthesis of Polymer F

According to the same manner as that for a polymer A except that a polymerization temperature was 70° C., a molar ratio of Co atom/1,3-butadiene was 1/73000, and an atomic ratio of Al/Co was 44/1 (the same conditions as those for Example 4), a polymer F was obtained at conversion degree of 75%.

Example 7

Synthesis of Polymer G

According to the same manner as that for a polymer A except that a polymerization temperature was 30° C., a polymer G was obtained at conversion degree of 85%.

Comparative Example 3

Synthesis of Polymer J

According to the same manner as that for a polymer A except that a mixed solvent was supplied at 250 mL/min., 1,3-butadiene was supplied at 53 g/min., a polymerization temperature was 60° C., a molar ratio of Co atom/1,3-butadiene was 1/70000, and an atomic ratio of Al/Co was 42/1, a polymer J was obtained at conversion degree of 85%.

The aforementioned polymers A–J were measured for the viscosity, the 1,2-bond content, a melting point, the crystallinity, the total halogen amount, the tensile strength, the tensile elongation, the wet skid resistance and the molded.

TABLE 1

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Polymer | A | B | C | D | E | F | G | H | I | J |
| Viscosity (poise) |  |  |  |  |  |  |  |  |  |  |
| 120° C. | 770 | 480 | 580 | 590 | 630 | 420 | 770 | 410 | 290 | 1340 |
| 150° C. | 560 | 400 | 460 | 490 | 540 | 360 | 640 | 310 | 240 | 1140 |
| 180° C. | 440 | 335 | 390 | 415 | 430 | 310 | 470 | 260 | 200 | 980 |
| 1,2-bond content (%) | 93 | 84 | 90 | 90 | 92 | 76 | 96 | 60 | 89 | 92 |
| Melting point (° C.) | 110 | 90 | 70 | 80 | 90 | 80 | 120 | — | 85 | 90 |
| Crystallinity (%) | 28.7 | 24.5 | 17.5 | 20.3 | 24.5 | 20.3 | 34.3 | 4.4 | 21.3 | 28.8 |
| Total halogen amount (ppm) | * | * | * | * | * | * | * | * | * | * |
| Tensile strength (kgf/cm²) | 130 | 100 | 65 | 85 | 105 | 60 | 135 | — | 35 | 145 |
| Tensile elongation (%) | 670 | 740 | 760 | 750 | 700 | 780 | 600 | — | 480 | 390 |
| Wet skid resistance | 0.79 | — | 0.84 | — | 0.83 | 0.91 | — | — | — | 0.78 |
| Molded particle appearance | ○ | ○ | ○ | ○ | ○ | ○ | ○ | Δ | ○ | x |

*Less than detection limit (30 ppm)
[1]—; not measured

Comparative Example 1

Synthesis of Polymer H

According to the same manner as that for a polymer A except that a polymerization temperature was 100° C., a polymer H was obtained at conversion degree of 65%.

Comparative Example 2

Synthesis of Polymer I

According to the same manner as that for a polymer A except that a polymerization temperature was 65° C., a polymer I was obtained at conversion degree of 85%.

Preparation of Halogen Added Polymer

Methylene chloride which had been conventionally used as a polymerization solvent for preparing 1,2-polybutadiene, was added to the aforementioned polymers A, B and C, respectively, so that 100 ppm was contained in terms of halogen, whereby, polymers K, L and M were obtained, respectively.

Examples 8–10

Comparative Examples 4–6

Regarding polymers A–C and K–M, the influence of inclusion of halogen on the thermal stability was confirmed by the aforementioned method. The results were shown in Table 2.

TABLE 2

|  | Example 8 | Comparative Example 4 | Example 9 | Comparative Example 5 | Example 10 | Comparative Example 6 |
|---|---|---|---|---|---|---|
| Polymer | A | K | B | L | C | M |
| Amount of chlorine to be added (ppm) | 0 | 100 | 0 | 100 | 0 | 100 |
| Total halogen amount (ppm) | * | 110 | * | 120 | * | 110 |
| Test line | 1 |  |  |  |  |  |

TABLE 2-continued

|  | Example 8 | Comparative Example 4 | Example 9 | Comparative Example 5 | Example 10 | Comparative Example 6 |
|---|---|---|---|---|---|---|
| Test line 2 |  |  |  |  |  |  |
| Test line 3 |  |  |  |  |  |  |
| Test line 4 |  |  |  |  |  |  |
| Test line 5 |  |  |  |  |  |  |
| Test line 6 |  |  |  |  |  |  |
| Test line 7 |  |  |  |  |  |  |
| Test line 8 |  |  |  |  |  |  |
| Test line 9 |  |  |  |  |  |  |
| Test line 10 |  |  |  |  |  |  |
| Test line 11 |  |  |  |  |  |  |
| Test line 12 |  |  |  |  |  |  |
| Test line 13 |  |  |  |  |  |  |
| Test line 14 |  |  |  |  |  |  |
| Test line 15 |  |  |  |  |  |  |
| Test line 16 |  |  |  |  |  |  |
| Test line 17 |  |  |  |  |  |  |
| Test line 18 |  |  |  |  |  |  |
| Test line 19 |  |  |  |  |  |  |
| Test line 20 |  |  |  |  |  |  |
| Test line 21 |  |  |  |  |  |  |
| Test line 22 |  |  |  |  |  |  |
| Test line 23 |  |  |  |  |  |  |
| Test line 24 |  |  |  |  |  |  |
| Test line 25 |  |  |  |  |  |  |
| Test line 26 |  |  |  |  |  |  |
| Test line 27 |  |  |  |  |  |  |
| Test line 28 |  |  |  |  |  |  |
| Test line 29 |  |  |  |  |  |  |
| Test line 30 |  |  |  |  |  |  |
| Test line 31 |  |  |  |  |  |  |
| Test line 32 |  |  |  |  |  |  |
| Test line 33 |  |  |  |  |  |  |
| Test line 34 |  |  |  |  |  |  |
| Test line 35 |  |  |  |  |  |  |
| Test line 36 |  |  |  |  |  |  |
| Test line 37 |  |  |  |  |  |  |
| Test line 38 |  |  |  |  |  |  |
| Test line 39 |  |  |  |  |  |  |
| Test line 40 |  |  |  |  |  |  |
| Test line 41 |  |  |  |  |  |  |
| Test line 42 |  |  |  |  |  |  |
| Test line 43 |  |  |  |  |  |  |
| Test line 44 |  |  |  |  |  |  |
| Test line 45 |  |  |  |  |  |  |
| Test line 46 |  |  |  |  |  |  |
| Test line 47 |  |  |  |  |  |  |
| Test line 48 |  |  |  |  |  |  |
| Test line 49 |  |  |  |  |  |  |
| Test line 50 |  |  |  |  |  |  |
| Stabilizing time (min) | 38 | 36 | 55 | 50 | 54 | 50 |

Polymer K: Polymer A with halogen added
Polymer L: Polymer B with halogen added
Polymer M: Polymer C with halogen added
*: Less than detection limit (30 ppm)

Examples 11–17

Then, in order to examine the film physical properties of polymers A–G, the parallel ray transmittance, the water vapor permeability and the gas permeability were measured. The results were shown in Table 3.

TABLE 3

|  | Example 11 | Example 12 | Example 13 | Example 14 | Example 15 | Example 16 | Example 17 |
|---|---|---|---|---|---|---|---|
| Polymer | A | B | C | D | E | F | G |
| Parallel ray transmittance (%) | 82 | 89 | 93 | 91 | 89 | 92 | 79 |
| Water vapor permeability (g/m$^2$ · 24 h) | 70 | — | 115 | — | 98 | — | — |

TABLE 3-continued

|  | Example 11 | Example 12 | Example 13 | Example 14 | Example 15 | Example 16 | Example 17 |
|---|---|---|---|---|---|---|---|
| Gas permeability × $10^7$ (cm²/cm² · sec · cmHg) | | | | | | | |
| Oxygen | 0.84 | — | 1.3 | — | 1.1 | — | — |
| Ethylene oxide | 38 | — | 56 | — | 49 | — | — |

[1]—; not measured

Examples 18–21

Comparative Examples 7–9

Regarding polymers A, C, E, F, H, I and J, vulcanized polymers were obtained by the aforementioned method, and the processability and the vulcanized polymers were assessed. The results were shown in Table 4.

TABLE 4

|  | Example 18 | Example 19 | Example 20 | Example 21 | Comparative Example 7 | Comparative Example 8 | Comparative Example 9 |
|---|---|---|---|---|---|---|---|
| Polymer | A | C | E | F | H | I | J |
| Processability Roll Workability | ○ | ○ | ○ | ○ | ○ | ○ | x |
| Vulcanization properties | | | | | | | |
| 300% Tensile stress (kgf/cm²) | 105 | 62 | 92 | 38 | 14 | 12 | — |
| Tensile strength (kgf/cm²) | 170 | 80 | 120 | 59 | 30 | 45 | 240 |
| Elongation (%) | 380 | 350 | 390 | 320 | 450 | 500 | 250 |
| Hardness (JIS A) | 94 | 72 | 85 | 62 | 41 | 38 | 98 |
| Compression permanent set (%) | 67 | 21 | 57 | 19 | 40 | 46 | 76 |
| Tear strength (kgf/cm) | 48 | 25 | 44 | 21 | 16 | 13 | 75 |
| Impact resilience (%) | 22 | 30 | 24 | 34 | 71 | 65 | 16 |
| Acron abrasion (CC/1000 times) | 0.19 | 0.12 | 0.16 | 0.11 | 0.07 | 0.13 | 0.14 |

[1]—; not measured

Test Results

From Table 1, in Comparative Example 1, the 1,2-bond content was outside of the present invention, the crystallinity was small, and the molded article appearance is inferior. In Comparative Example 2, the viscosity (120° C. and 150° C.) was outside of the present invention, and the tensile strength and the tensile elongation were inferior as compared with Examples. In Comparative Example 3, the viscosity (120° C., 150° C., and 180° C.) was outside of the present invention, and the tensile elongation and the molded article appearance are inferior. On the other hand, in all of polymers A–G of Examples 1–7, the 1,2-bond content exceeded 70%, and all of the viscosities at 120° C., 150° C. and 180° C. were within the present invention. The tensile elongation were high figures as 600–780%, and the molded article appearance was also excellent. The total halogen amount was less than a detection limit (30 ppm) for an analyzing apparatus, and there was little influence of a catalyst.

From the results of Table 2, it can be seen that, when halogen is contained at 100 ppm, a polymer is deteriorated during kneading, an initial time for torque (stabilizing time) was shortened, and the thermal stability was inferior.

From the results of Table 3, it can be seen that 1,2-polybutadiene of the present invention is excellent in the transparency and the water vapor permeability, and is also excellent in the gas permeability for oxygen and ethylene oxide.

From the results of Table 4, in Comparative Example 7, the elongation and the impact resilience of a vulcanized polymer were excellent, and the 300% tensile stress, the tensile strength, the hardness and the tear strength were inferior. In Comparative Example 8, the elongation, the tear strength and the impact resilience of a vulcanized polymer were inferior. In Comparative Example 6, the roll workability in the processability was remarkably worse. On the other hand, in Examples 18–21, all could be vulcanized, and vulcanized polymers having the high hardness and the excellent strength were obtained even without reinforcing agent. In particular, in Example 18 and Example 20, the excellent physical properties were exhibited in the 300% tensile stress, the tensile strength, the hardness, the compression permanent set strain and the tear strength.

(3) Evaluation of Thermoplastic Elastomer Composition

Examples 22–23

Comparative Examples 10–14

Each of polymers A, B, H, I, J, and K and a styrene butadiene block polymer (SBS; trade name "TR2827", manufactured by JSR) were blended at a ratio by weight of 30/70, respectively (see Table 5), to prepare a composition. Assessment of each thermoplastic elastomer composition was performed according to the aforementioned ⑧. Only SBS without polymer (Comparative Example 10) was also assessed. The results were shown in Table 5.

TABLE 5

|  | Example 22 | Example 23 | Comparative Example 10 | Comparative Example 11 | Comparative Example 12 | Comparative Example 13 | Comparative Example 14 |
|---|---|---|---|---|---|---|---|
| Polymer | A | B | none | H | I | J | K |
| Polymer/SBS | 30/70 | 30/70 | 0/100 | 30/70 | 30/70 | 30/70 | 30/70 |
| Molded article appearance | ○ | ○ | x | Δ | Δ | Δ | Δ |

Polyer K: Polymer A with halogen added

Test Results

From Table 5, since Comparative Example 11 has the 1,2-bond content in a polymer H outside of the present invention, and Comparative Examples 12 and 13 have the viscosity of polymers I and J outside of the present invention, the molded article appearance is not sufficient. Since Comparative Example 14 contains halogen and, therefore, the thermal stability is worse, the molded article appearance is not sufficient. In addition, Comparative Example 10 containing no 1,2-polybutadiene is remarkably inferior in the molded article appearance. On the other hand, it can be seen that, since all of Examples 22 and 23 contain a polymer (A and B, respectively) at 30 parts by weight, the molded article appearance is improved.

(4) Evaluation of Polymer Composition

Examples 24–25

Comparative Examples 15–19

Each of polymers A, B, H, I, J, and K and low density polyethylene (LDPE; trade name "Novatech YF39", manufactured by Nihonpolychem) were blended at a ratio by weight of 30/70, respectively (See Table 6), to prepare a composition. Assessment of each polymer composition was performed according to the aforementioned . Only LDPE without polymer (Comparative Example 15) was also assessed. The results were shown in Table 6.

Examples 24 and 25 contain a polymer (A and B, respectively) at 30 parts by weight, the scratch resistance is improved.

Industrial Applicability

The 1,2-polybutadiene of the present invention solves a problem of the mold contamination and the thermal deterioration at high temperature molding and change in the physical properties with time, is excellent in the properties such as the moldability, the transparency, the mechanical strength and the wet skid resistance, and is suitably used in uses as a thermoplastic elastomer, for example, uses such as industrial parts and various molded articles such as footwears, various sheets, films and the like. In addition, 1,2-polubutadiene of the present invention has a molding temperature of about 150° C., being lower among thermoplastic elastomers, and is advantageous also in respect of the energy. In addition, since 1,2-polybutadiene of the present invention can be vulcanized with sulfur and is excellent in a degree of the peroxide cross-linking activity and the filling property of a filler and a drug, it can be utilized as a vulcanizing rubber, or as a reaction aid for other vulcanizing rubbers.

In addition, the thermoplastic elastomer composition of the present invention is excellent in moldability and the molding appearance, and the polymer composition of the present invention has the excellent nature in the scratch resistance.

TABLE 6

|  | Example 24 | Example 25 | Comparative Example 15 | Comparative Example 16 | Comparative Example 17 | Comparative Example 18 | Comparative Example 19 |
|---|---|---|---|---|---|---|---|
| Polymer | A | B | none | H | I | J | K |
| Polymer/LDPE | 30/70 | 30/70 | 0/100 | 30/70 | 30/70 | 30/70 | 30/70 |
| Scratch resistance | ○ | ○ | x | x | Δ | Δ | Δ |

Polymer K: Polymer A with halogen added

Test Results

From Table 6, since Comparative Example 16 has the 1,2-bond content of a polymer H outside of the present invention, the scratch resistance is remarkably inferior. Since Comparative Examples 17 and 18 have the viscosities of polymers I and J outside of the present invention, and since Comparative Example 19 contains halogen and has the deteriorated thermal stability, the scratch resistance is not sufficient. Further, Comparative Example 15 without 1,2-polybutadiene is remarkably inferior in the scratch resistance. On the other hand, it can be seen that since both of

What is claimed is:

1. A thermoplastic elastomer composition, which comprises (a) a thermoplastic elastomer selected from the group consisting of an aromatic vinyl-based thermoplastic elastomer, an urethane-based thermoplastic elastomer, a polyester-based thermoplastic elastomer, a polyamide-based thermoplastic elastomer, a vinyl chloride-based thermoplastic elastomer and a fluorine-based thermoplastic elastomer, and (b) a 1,2-polybutadiene having    1) a 1,2-bond content in the butadiene unit of 70% by weight or more,    2) a melting point in the range of 50 to 140° C.,    3) a viscosity η in the range of 400 to 1200 poise when measured with a slit die rheometer at a shear rate of 5113 sec$^{-1}$ at 120° C.

4) a viscosity η in the range of 300 to 1000 poise when measured with a slit die rheometer at a shear rate of 5113 sec$^{-1}$ at 150° C.,    5) a viscosity η in the range of 200 to 800 poise when measured with a slit die rheometer at a shear rate of 5113 sec$^{-1}$ at 180° C., and    6) a total halogen content of 30 ppm or less.

2. The thermoplastic elastomer composition according to claim 1, which comprises 50 to 99 parts by weight of said thermoplastic elastomer and 1 to 50 part by weight of said 1,2-polybutadiene.

3. The thermoplastic elastomer composition according to claim 1, wherein said thermoplastic elastomer is an aromatic vinyl-based thermoplastic elastomer.

4. The thermoplastic elastomer composition according to claim 3, wherein said aromatic vinyl-based thermoplastic elastomer is at least one selected from the group consisting of a block copolymer of an aromatic vinyl compound and conjugated diolefin hydrogenated block copolymer of said block copolymer of an aromatic vinyl compound and conjugated diolefin, and mixtures thereof.

5. A polymer composition, which comprises
(a) a polyolefin-based polymer and
(b) a 1,2-polybutadiene having    1) a 1,2-bond content in the butadiene unit of 70% by weight or more,    2) a melting point in the range of 50 to 140° C.,    3) a viscosity η in the range of 400 to 1200 poise when measured with a slit die rheometer at a shear rate of 5113 sec$^{-1}$ at 120° C.,    4) a viscosity η in the range of 300 to 1000 poise when measured with a slit die rheometer at a shear rate of 5113 sec$^{-1}$ at 150° C.

5) a viscosity η in the range of 200 to 800 poise when measured with a slit die rheometer at a shear rate of 5113 sec$^{-1}$ at 180° C., and    6) a total halogen content of 30 ppm or less.

6. The polymer composition according to claim 5, which comprises 70 to 99 parts by weight of said polyolefin-based polymer and 1 to 30 parts by weight of said 1,2-polybutadiene.

7. The polymer composition according to claim 5, wherein said polyolefin-based polymer comprises at least one selected from the group consisting of an ethylene component, a propylene component, a butylenes component, and mixtures thereof.

8. The polymer composition according to claim 7, wherein said polyolefin-based polymer is at least one selected from the group consisting of polyethylene, polypropylene, crystalline ethylene-propylene copolymer, ethylene-vinyl acetate polymer, and mixtures thereof.

* * * * *